US010321423B2

(12) United States Patent
Liu et al.

(10) Patent No.: US 10,321,423 B2
(45) Date of Patent: Jun. 11, 2019

(54) NAN DATA BEACON

(71) Applicant: Apple Inc., Cupertino, CA (US)

(72) Inventors: Yong Liu, Campbell, CA (US);
Christiaan A. Hartman, San Jose, CA (US); Guoqing Li, Cupertino, CA (US);
Su Khiong Yong, Palo Alto, CA (US);
Lawrie Kurian, San Jose, CA (US);
Peter N. Heerboth, San Jose, CA (US)

(73) Assignee: Apple Inc., Cupertino, CA (US)

( * ) Notice: Subject to any disclaimer, the term of this patent is extended or adjusted under 35 U.S.C. 154(b) by 113 days.

(21) Appl. No.: 15/335,747

(22) Filed: Oct. 27, 2016

(65) Prior Publication Data

US 2017/0127369 A1    May 4, 2017

Related U.S. Application Data

(60) Provisional application No. 62/249,854, filed on Nov. 2, 2015.

(51) Int. Cl.
*H04J 3/06*    (2006.01)
*H04W 56/00*   (2009.01)
*H04W 76/14*   (2018.01)
*H04W 8/00*    (2009.01)
*H04W 84/12*   (2009.01)

(52) U.S. Cl.
CPC ....... *H04W 56/0015* (2013.01); *H04W 8/005* (2013.01); *H04W 76/14* (2018.02); *H04W 84/12* (2013.01)

(58) Field of Classification Search
CPC ............ H04W 56/0015; H04W 84/12; H04W 76/023; H04W 8/005; H04W 56/00; H04W 76/02; H04W 8/00
See application file for complete search history.

(56) References Cited

U.S. PATENT DOCUMENTS

| 9,258,193 | B2 | 2/2016 | Kasslin et al. | |
|---|---|---|---|---|
| 9,503,961 | B2 | 11/2016 | Oren | |
| 2007/0036082 | A1* | 2/2007 | Sonksen | G06F 11/221 370/242 |
| 2008/0259895 | A1* | 10/2008 | Habetha | H04W 74/04 370/345 |

(Continued)

*Primary Examiner* — Yemane Mesfin
*Assistant Examiner* — Abdelillah Elmejjarmi
(74) *Attorney, Agent, or Firm* — Meyertons Hood Kivlin Kowert and Goetzel PC; Jeffrey C. Hood; Brian E. Moore

(57) ABSTRACT

In some embodiments, one or more wireless stations operate to configure direct communication with neighboring mobile stations, e.g., direct communication between the wireless stations without utilizing an intermediate access point. Embodiments of the disclosure relate to a mechanism for a wireless station to discover a neighboring peer wireless station, e.g., via peer-to-peer Wi-Fi communications, receive a synchronization beacon(s) from the neighboring peer wireless station, and synchronize timing with the neighboring peer wireless station based at least in part on the synchronization beacon(s). In addition, the wireless station may transmit, e.g., via Wi-Fi peer-to-peer communications, a data beacon to one or more neighboring wireless devices stations, wherein the one or more neighboring wireless stations are configured to synchronize timing with the wireless station based on the data beacon.

20 Claims, 9 Drawing Sheets

(56) References Cited

U.S. PATENT DOCUMENTS

2014/0269670 A1* 9/2014 Park .................. H04W 56/00
                                                    370/350
2015/0223047 A1    8/2015 Abraham et al.
2016/0165653 A1    6/2016 Liu et al.
2016/0337836 A1* 11/2016 Kim .................... H04W 4/08
2016/0353233 A1   12/2016 Yong et al.

* cited by examiner

| Octets | FC | Duration | A1 | A2 | A3 | Seq. Ctrl. | Time Stamp | Beacon Interval | Capability | NAN IE | FCS |
|---|---|---|---|---|---|---|---|---|---|---|---|
| | 2 | 2 | 6 | 6 | 6 | 2 | 8 | 2 | 2 | Variable | 4 |

FIG. 5
(Prior Art)

NAN DATA BEACON

PRIORITY DATA

This application claims benefit of priority to U.S. Provisional Application Ser. No. 62/249,854, titled "Proxy NAN Data Beacon", filed Nov. 2, 2015, by Yong Liu, Christiaan A. Hartman, Guoqing Li, Su Khiong Yong, Lawrie Kurian, and Peter N. Heerboth which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems Wi-Fi mobile stations are able to communicate directly with each other without using an intermediate access point. However, improvements in the operation of such devices are desired, such as in setup and coordination of the communication between such devices.

SUMMARY

Some embodiments described herein relate to systems and methods for peer devices to assist one another in remaining synchronized as device roles are changed and/or updated.

Some embodiments relate to a wireless station that includes one or more antennas, one or more radios, and one or more processors coupled (directly or indirectly) to the radios. At least one radio is configured to perform Wi-Fi communications. The wireless station may perform voice and/or data communications, as well as any/all of the methods described herein.

In some embodiments, one or more wireless stations operate to configure direct communication with neighboring mobile stations, e.g., direct communication between the wireless stations without utilizing an intermediate access point. Embodiments of the disclosure relate to a mechanism for peer devices to assist one another in remaining synchronized as device roles are changed and/or updated. In some embodiments, a wireless station may discover a neighboring peer wireless station, e.g., via peer-to-peer Wi-Fi communications, receive a synchronization beacon(s) from the neighboring peer wireless station, and synchronize timing with the neighboring peer wireless station based in part on the synchronization beacon(s). In addition, the wireless station may transmit, e.g., via Wi-Fi peer-to-peer communications, a data beacon to one or more neighboring wireless devices stations, wherein the one or more neighboring wireless stations are configured to synchronize timing with the wireless station based on the data beacon.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 5 illustrates an example of a NAN beacon, according to existing implementations.

Figure 1:
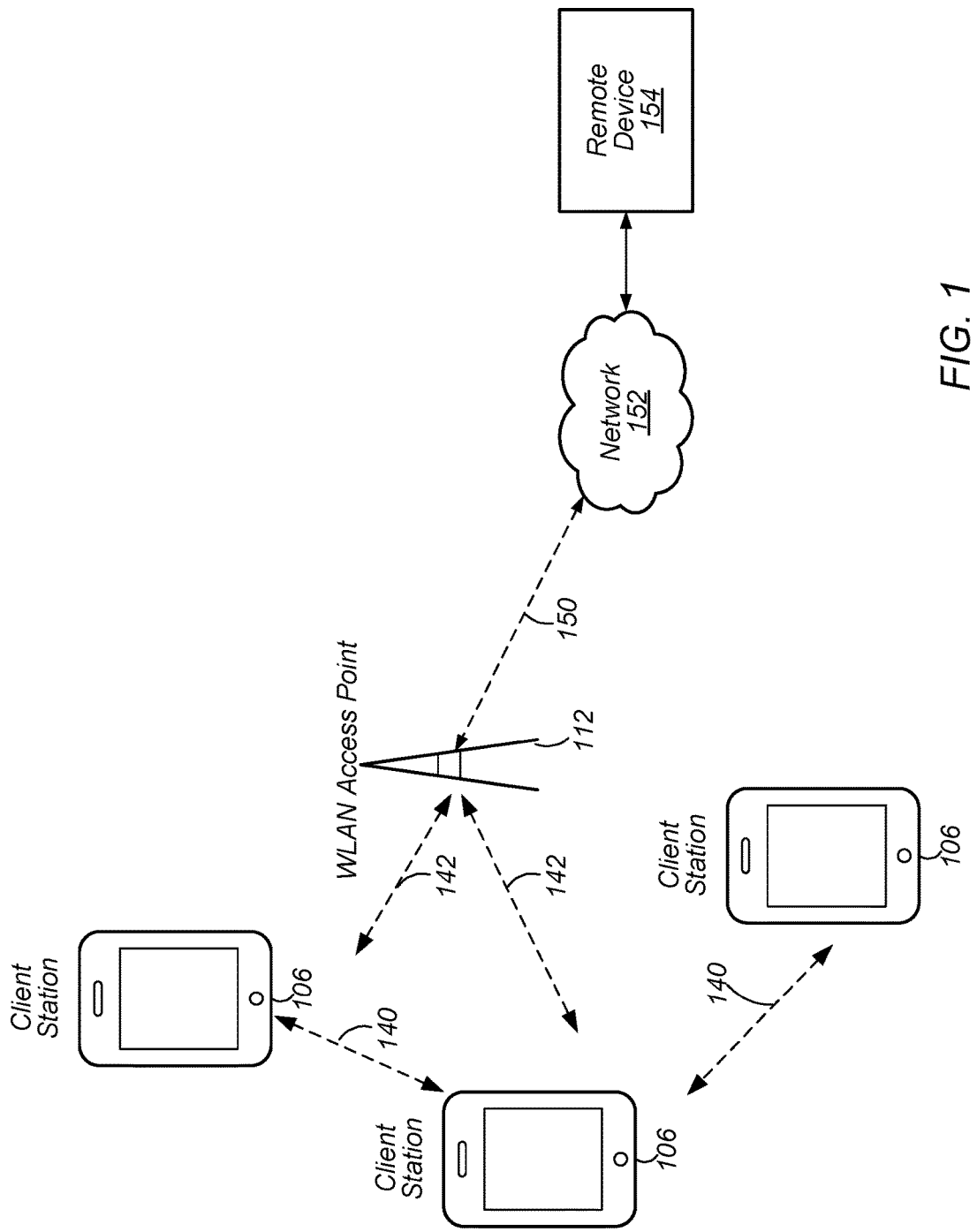
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods to discover a neighboring peer wireless device, e.g., via peer-to-peer Wi-Fi communications, receive a synchronization beacon(s) from the neighboring peer wireless device, and synchronize timing with the neighboring peer wireless device based in part on the synchronization beacon(s). In addition, the wireless device may transmit, e.g., via Wi-Fi peer-to-peer communications, a data beacon to one or more neighboring wireless devices, wherein the one or more neighboring wireless devices are configured to synchronize timing with the wireless device based on the data beacon.

Figure 2:
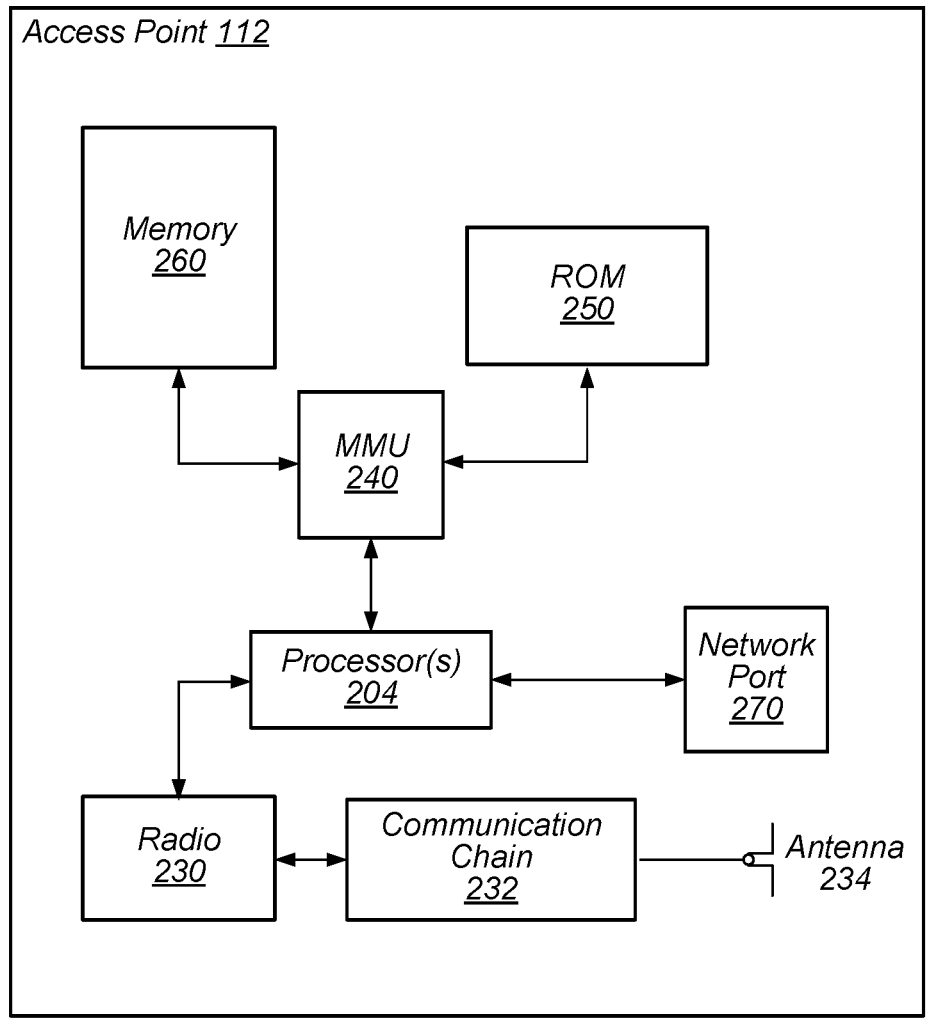
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods to discover a neighboring peer wireless station, e.g., via peer-to-peer Wi-Fi communications, receive a synchronization beacon(s) from the neighboring peer wireless station, and synchronize timing with the neighboring peer wireless station based in part on the synchronization beacon(s). In addition, the AP 112 may transmit, e.g., via Wi-Fi peer-to-peer communications, a data beacon to one or more neighboring wireless devices stations, wherein the one or more neighboring wireless stations are configured to synchronize timing with the wireless station based on the data beacon.

Figure 3:
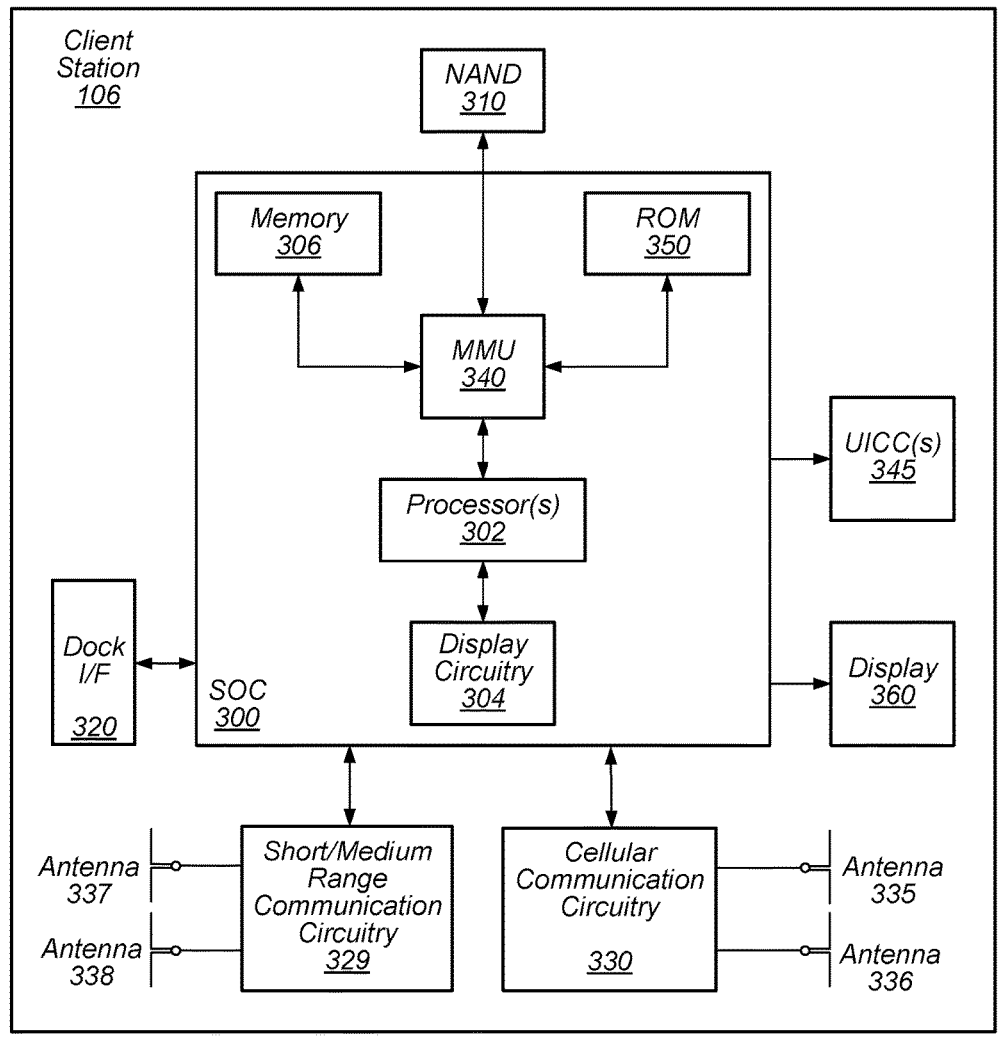
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods to discover a neighboring peer wireless station, e.g., via peer-to-peer Wi-Fi communications, receive a synchronization beacon(s) from the neighboring peer wireless station, and synchronize timing with the neighboring peer wireless station based in part on the synchronization beacon(s). In addition, the wireless station may transmit, e.g., via Wi-Fi peer-to-peer communications, a data beacon to one or more neighboring wireless devices stations, wherein the one or more neighboring wireless stations are configured to synchronize timing with the wireless station based on the data beacon.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein further define methods for a NAN device to broadcast a NAN data beacon.

NAN Beacons

NAN 1.0 defines two NAN beacons—a NAN synchronization beacon and a NAN discovery beacon. A NAN synchronization beacon may be transmitted by both master and non-master sync NAN devices within discovery windows and may be used to allow peer NAN devices in a NAN cluster to maintain synchronization with (or remain or become synchronized to) a NAN anchor master. A NAN discovery beacon may be transmitted by master devices outside of discovery windows and may be used to advertise a NAN cluster to peer NAN devices not in the NAN cluster.

Figure 4:
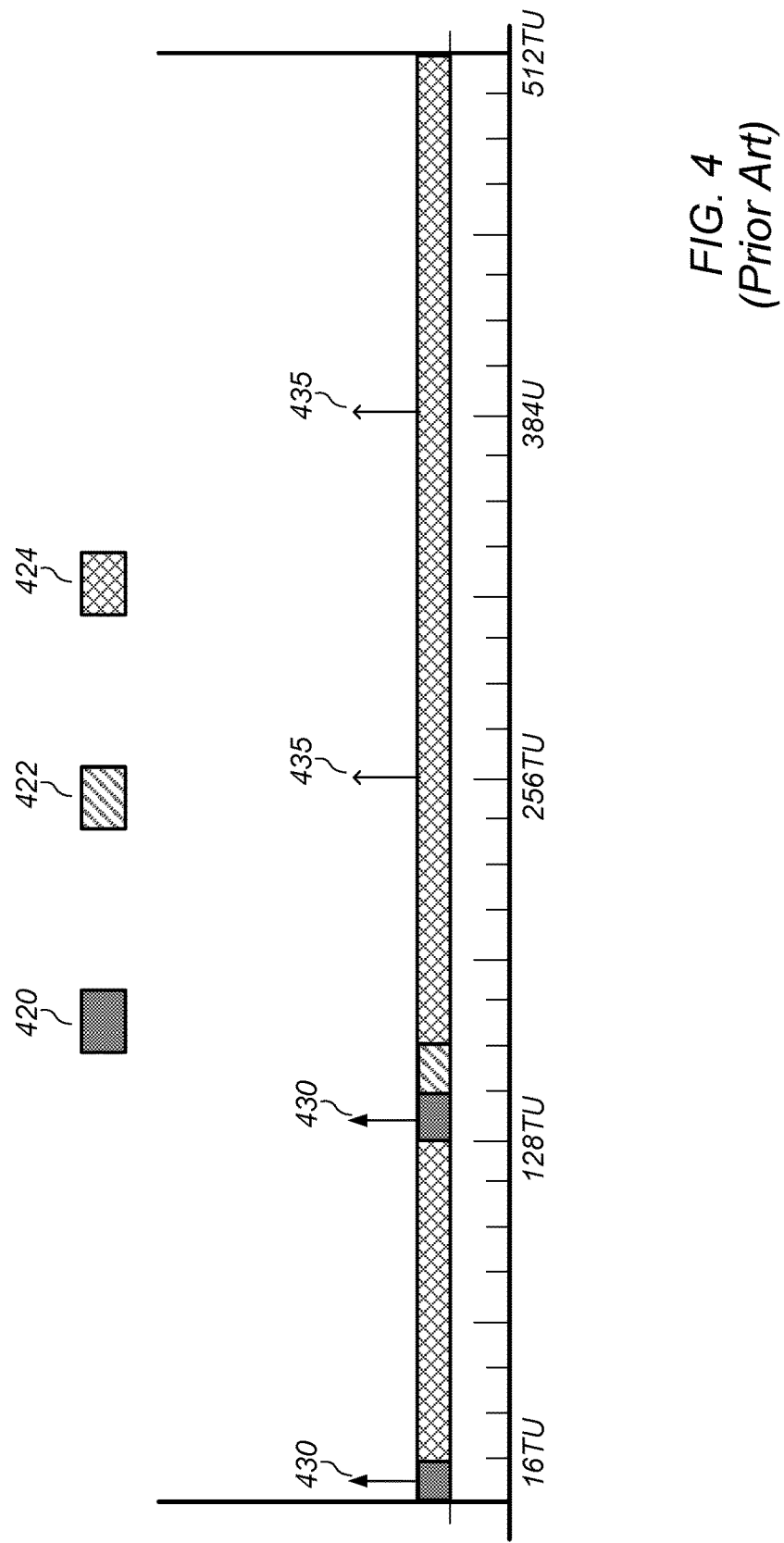
FIG. 4 illustrates an example of a NAN beaconing schedule, according to existing implementations.

For example, FIG. 4 illustrates an example of a NAN beaconing schedule, according to some existing implementations. As shown, a NAN scheduling frame (e.g., a 512 time unit (TU) span) may include discovery windows 420 (each may be 16 TUs) as well as base schedule meeting window 422 (which may be 16 TUs and may allow devices in a common data cluster a scheduled meeting time). The remainder of the schedule may be reserved for data link scheduling 424. In addition, a device (e.g., a master or non-master sync device) may transmit NAN synchronization beacons 430 in each discovery window 420. In addition, a master device may periodically transmit NAN discovery beacons 435 outside of discovery windows 420.

FIG. 5 illustrates a format of a NAN beacon, according to some existing implementations. As shown, a NAN beacon may include fields such as frame check (FC), duration, A1, A2, A3, sequence control, time stamp, beacon interval, capability, NAN IE, and frame check sequence (FCS). Note that A1 represents a NAN identifier (ID), A2 represents the transmitter MAC address, and A3 represents a cluster ID that identifies a NAN cluster. In addition, the time stamp indicates a time at which a beacon was transmitted. NAN IE in NAN synchronization and discovery beacons can include information such as NAN device role/state information (e.g., master or non-master role, sync and non-sync state) and cluster information (e.g., anchor master rank, hop counter to anchor master, and anchor master beacon transmission time (AMBTT)).

As described above, a data cluster (e.g., a NAN data cluster) refers to a set of peer wireless stations in a common (e.g., same) cluster (e.g., NAN cluster) that share a common base schedule (e.g., a NAN data cluster base schedule). In addition, peer wireless stations in a data cluster may share at least one data link (e.g., NAN data link) with another member wireless station within the data cluster. Thus, a data cluster may be formed when two or more peer wireless stations (e.g., peer NAN devices) establish data links. In addition, peer devices in a common data cluster may be present at data cluster base windows as specified by a data cluster base schedule. In addition, peer devices in the data cluster may maintain tight synchronization in order to support constant data communications. However, synchronization provided by a cluster may not guarantee complete network coverage (e.g., complete coverage of the cluster) because some peer devices may be in a non-master, non-sync state and may not transmit any beacons.

In addition, NAN synchronization and discovery beacons were not designed to aid with data cluster and data link management operations such as data cluster tight synchronization and data cluster/data link scheduling. Further, discovery windows (e.g., NAN discovery windows) may be too crowed (e.g., contain too much traffic) to accommodate data cluster management operations.

Data Cluster Data Beacon

In some embodiments, an additional beacon (e.g. NAN beacon), known as a data cluster data beacon (e.g., a NAN data beacon) or data beacon, may be implemented for data cluster and data link management purposes. As described herein, a data beacon may be transmitted periodically, on demand, and/or as needed during data cluster base windows. Alternatively, or in addition, a data cluster member device may schedule a data beacon transmission during a discovery window if the member device does not detect channel activities for a prolonged period of time (e.g., if the discovery window is underutilized).

Figure 6:
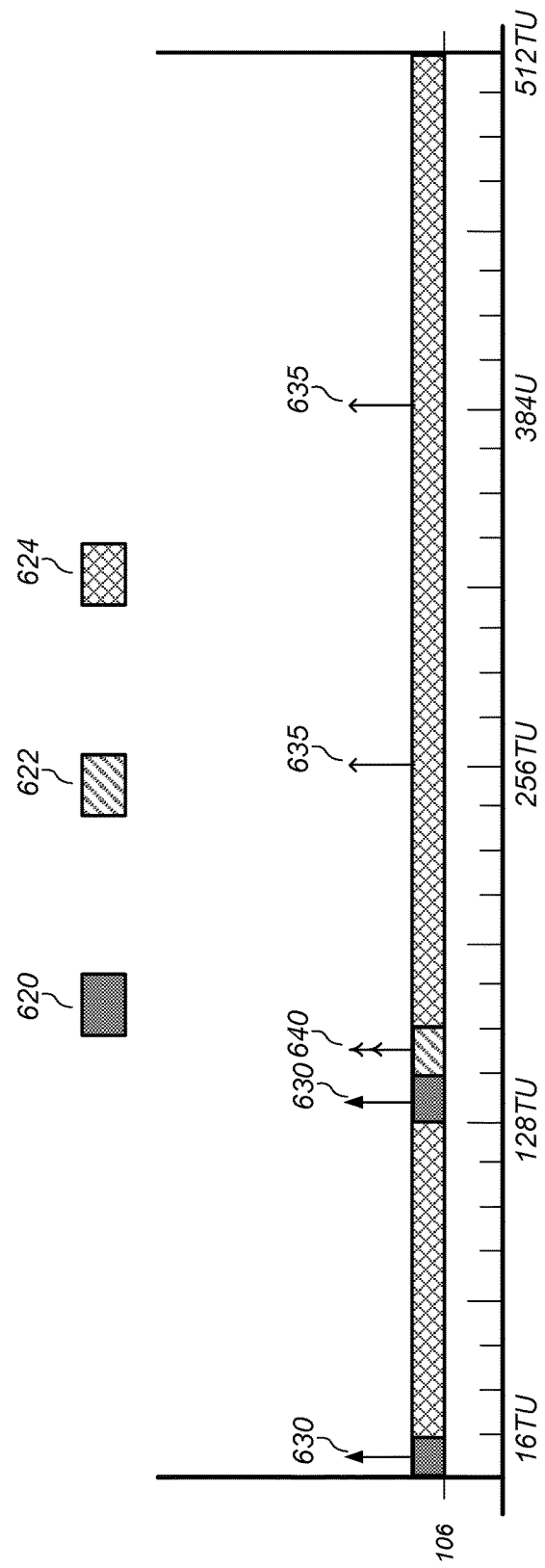
FIG. 6 illustrates an example of a NAN beaconing schedule, according to some embodiments.

For example, FIG. 6 illustrates an example of a NAN beaconing schedule, according to some embodiments. As shown, a NAN scheduling frame (e.g., a 512 time unit (TU) span) may include discovery windows 620 (each may be 16 TUs) as well as base schedule meeting window 622 (which may be 16 TUs and may allow devices in a common data cluster a scheduled meeting time). The remainder of the schedule may be reserved for data link scheduling 624. In addition, a device (e.g., a master or non-master sync device) may transmit NAN synchronization beacons 630 in one or more discovery windows 620. Further, a master device may periodically transmit NAN discovery beacons 635 outside of discovery windows 620. Further, a device, such as client station 106, may transmit a data beacon 640 in a base schedule meeting (or base) window 622.

As another example, in existing implementations, when a peer data cluster member device changes its role/state from master/non-master sync to non-master, non-sync, the member device stops transmitting synchronization and discovery beacons. However, other member devices of the data cluster may have originally relied on the member device to synchronize to a cluster prior to the member device changing its role and state. In addition, in existing implementations, when a data cluster member device merges to a new cluster in a non-master, non-sync state, the member device does not transmit synchronization and discovery beacons after merging. However, other member devices of the data cluster may have relied on the member device to synchronize to the new cluster.

In some embodiments, when a data cluster member device (e.g., a NAN data cluster member device), such as client station 106, changes its state/role to non-master, non-sync state/role in a cluster, the member device may schedule data beacon transmissions in order to maintain tight synchronization with other data cluster members. In addition, to provide cluster synchronization assistance, a data beacon may include (or carry) all cluster synchronization related information and/or fields that are also included in a synchronization beacon (e.g., a NAN synchronization beacon). For example, a data beacon (e.g., a NAN data beacon) may include fields and/or information such as time stamp, device role/state information (e.g., master or non-master roles, sync or non-sync state), cluster information (e.g., cluster ID, anchor master rank, hop counter to anchor master, and/or anchor master beacon transmission time (AMBTT)). In addition, in some embodiments, a data beacon may also include address fields A1, A2, and A3. Thus, when a peer device joins a data cluster and receives a data beacon with a corresponding data cluster ID, the peer device may update its TSF timer and anchor master record, as needed, or the peer device may update its TSF timer, anchor master record, and role/state, as needed.

Further, in some embodiments, a data cluster member (e.g., such as client station 106) may use a data beacon to announce an intention to merge to a new cluster at a future point in time and/or to change to a new data cluster at a future point in time. If the data cluster member is announcing a merge to a new cluster, the data beacon may include a new cluster ID (e.g., corresponding to the new cluster), new cluster anchor master rank, clock/TSF offset between current and new clusters, merging time and/or count down, and/or device operation schedule changes. If the data cluster member is announcing a change to a new data cluster, the data beacon may include a new data cluster ID (e.g., corresponding to the new data cluster), new data cluster base schedule (e.g., base windows), changing time and/or count down, and/or device operation schedule changes.

In some embodiments, when a device receives a data beacon indicating an intention of an initiating device to merge to a new cluster and/or to change to a new data cluster, the device may choose to merge/change together with the initiating device via synchronizing TSF clocks with the received data beacon and announcing its own changes by using/transmitting data beacons.

In some embodiments, a data cluster member device may use a data beacon to announce device updates. For example, the data beacon may include the member device's further availability (FA), data link schedule, and/or data link schedule proposal updates, the member device's FA preference and limitation updates, the member device's capabilities and operation modes updates, and/or pending data transmission indications, e.g., pending unicast transmissions to individual peers and pending multicast/broadcast transmissions.

In some embodiments, when a first peer device that has an active data link with a second peer device that is announcing device updates via a data beacon receives the data beacon from the second peer device, the first peer device may synchronize its TSF clock with the received data beacon, adjust its FA and data link schedules accordingly, adjust its operation modes accordingly, trigger the second peer device (e.g., beacon transmitter) to release pending transmissions, and/or go to sleep if there is not any pending transmissions.

In some embodiments, to mitigate medium access control issues in a dense (or very dense) data cluster, a peer device may suppress data beacons. For example, in a dense NAN cluster, a large number of member devices may be in a non-master, non-sync state and may compete for medium access during data cluster base windows to transmit data beacons, e.g., when a data cluster change announcement is propagated within the data cluster, a large number of the member devices may relay the announcement during a data cluster base window leading to traffic congestion. Hence, in some embodiments, a peer device (e.g., client station 106) that intends to transmit a data beacon within a data cluster base window may choose a random back off window before transmitting the data beacon. Note that if the device receives one or more data beacons from peer devices before it completes its back off window, the device may determine to suppress its data beacon transmission and/or freeze its data beacon transmission for the data cluster base window.

In addition, the device may determine whether to suppress its beacon transmission based on content of the data beacon and/or medium conditions. For example, if the device's data beacon only serves for tight synchronization purposes and the device already received several data beacons that can also serve for tight synchronization, the device may skip its own data beacon transmission. Note, however, that when a device skips its data beacon transmission in one data cluster base window, the device may have priority to select a shorter back off window in a subsequent data cluster base window until it obtains an opportunity to transmit its data beacon.

In some embodiments, if the device intends to use the data beacon to deliver urgent data cluster/device updates, but is not able to transmit the data beacon due to medium contention, the device may convert the updates to unicast transmissions.

In some embodiments, a data cluster member device (e.g., peer device such as client station 106) may need to transmit both a synchronization beacon and a data beacon if the device is in a master role or a non-master sync state and the device intends to transmit any of a data cluster update, a data link update, and/or a device update.

Further, in some embodiments, an extended synchronization beacon may be implemented to carry data cluster ID and data cluster, data link, and/or device update information so that a device may transmit the extended synchronization beacon in a discovery window if the device is in a master role or non-master sync state. Alternatively, or in addition, the device may transmit the extended synchronization beacon and/or a data beacon in a data cluster base window if it is in a non-master, non-sync state.

Note that legacy devices (e.g., devices not capable of supporting an extended synchronization beacon) may treat the extended synchronization beacon as a standard synchronization beacon by ignoring an amended data cluster update, data link update, and/or device update information.

In some embodiments, a device in a master role or a non-master sync state may determine to transmit an extended synchronization beacon and/or a data beacon in a data cluster base window if it is not able to transmit an extended synchronization beacon in a previous discovery window.

Figure 7:
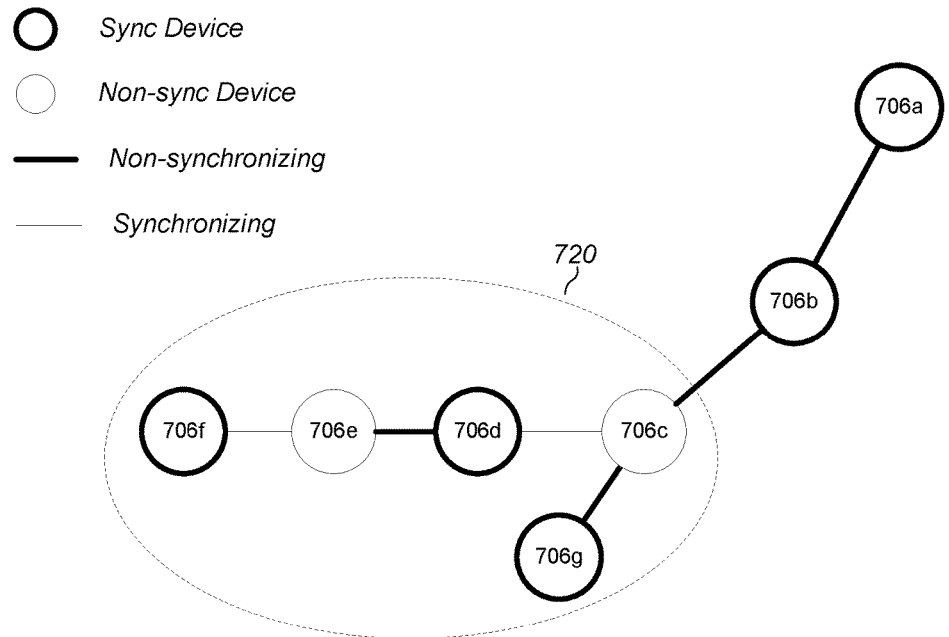
FIGS. 7-10 illustrate various examples of peer device synchronization, according to some embodiments.

FIGS. 7-10 various examples of peer device synchronization, according to some embodiments. In other words, FIGS. 7-10 illustrate examples of data cluster tight synchronization via data cluster data beacons (e.g., data beacons such as NAN data beacons as described above), according to some embodiments. As FIG. 7 illustrates, peer devices 706*c*-*g* may be included in (or form) a data cluster 720 (e.g., a NAN data cluster). At some point in time after the data cluster 720 has been created, device 706*c* may discover a new anchor master, such as device 706*a* and may start to synchronize to device 706*b*, which in turn may synchronize to device 706*a*. However, based on the NAN 1.0 standard, since device 706*c* is in close proximity to device 706*b*, device 706*c* may become a non-master, non-sync device. Thus, in order to main tight synchronization with devices 706*d* and 706*g*, device 706*c* may transmit a data beacon. In response, devices 706*d* and 706*g* may synchronize to device 706*c* based on the received data beacon from device 706*c*. In addition, devices 706*d* and 706*g* may update their respective anchor master records. Further, since devices 706*d* and 706*g* may not receive synchronization beacons during discovery windows, either or both of devices 706*d* and 706*g* may become master devices. Note that although device 706*g* is in close proximity to device 706*c*, it may not change to a master role based on the received data beacons from 706*c*.

In addition, when either or both of devices 706*d* and 706*g* become master devices, they may begin to transmit synchronization beacons inside discovery windows and discovery beacons outside of discovery windows. Thus, device 706*e* may synchronize to device 706*d* based on device 706*d*'s synchronization beacon and since device 706*e* may be in close proximity to device 706*d*, device 706*e* may assume a non-master, non-sync state and may begin to transmit data beacons. Further, device 706*f* may synchronize to device 706*e* based on data beacons received from device 706*e*. In addition, device 706*f* may also become a master device since device 706*f* may not receive any synchronization beacons during discover windows. Hence, device 706*f* may begin to transmit synchronization beacons during discovery windows and discovery beacons outside of discovery windows.

Figure 8:
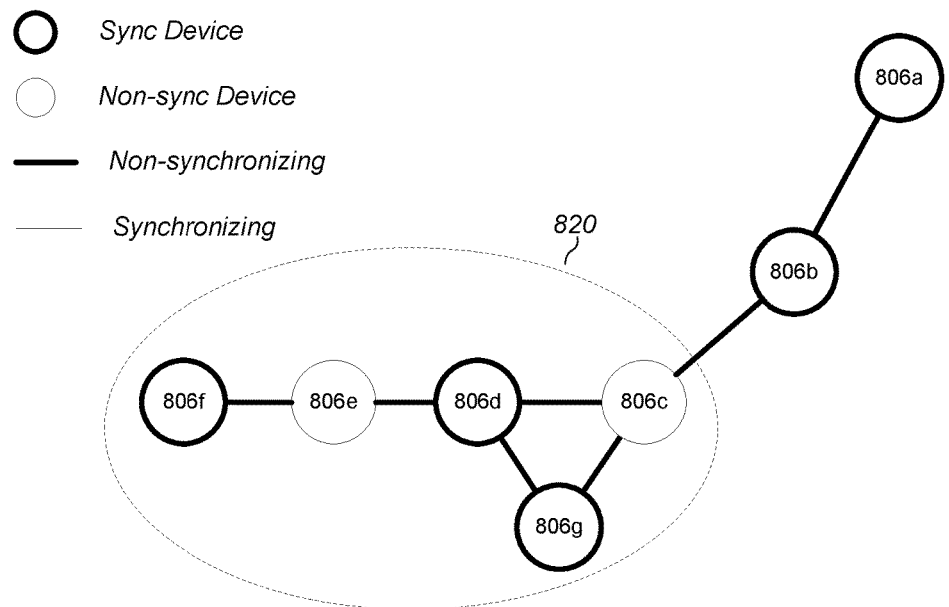

FIG. 8 illustrates another example of peer device synchronization, according to some embodiments. As illustrated, peer devices 806*c*-*g* may be included in (or form) a data cluster 820 (e.g., a NAN data cluster). At some point in time after the data cluster 820 has been created, device 806*c* may discover a new anchor master, such as device 806*a* and may start to synchronize to device 806*b*, which in turn may synchronize to device 806*a*. However, based on the NAN 1.0 standard, since device 806*c* is in close proximity to device 806*b*, device 806*c* may become a non-master, non-sync device. Thus, in order to main tight synchronization with devices 806*d* and 806*g*, device 806*c* may transmit a data beacon. In response, devices 806*d* and 806*g* may synchronize to device 806*c* based on the received data beacon from device 806*c*. In addition, devices 806*d* and 806*g* may update their respective anchor master records. Further, since devices 806*d* and 806*g* may not receive synchronization beacons during discovery windows, both of devices 806*d* and 806*g* may become master devices. Thus, when devices 806*d* and 806*g* become master devices, they may begin to transmit synchronization beacons inside discovery windows and discovery beacons outside of discovery windows. Thus, device 806*e* may synchronize to device 806*d* based on device 806*d*'s synchronization beacon and since device 806*e* may be in close proximity to device 806*d*, device 806*e* may assume a non-master, non-sync state and may begin to transmit data beacons. Further, device 806*f* may synchronize to device 806*e* based on data beacons received from device 806*e*. In addition, device 806*f* may also become a master device since device 806*f* may not receive any synchronization beacons during discover windows. Hence, device 806*f* may begin to transmit synchronization beacons during discovery windows and discovery beacons outside of discovery windows and device 806*e* may synchronize with device 806*f*.

Figure 9:
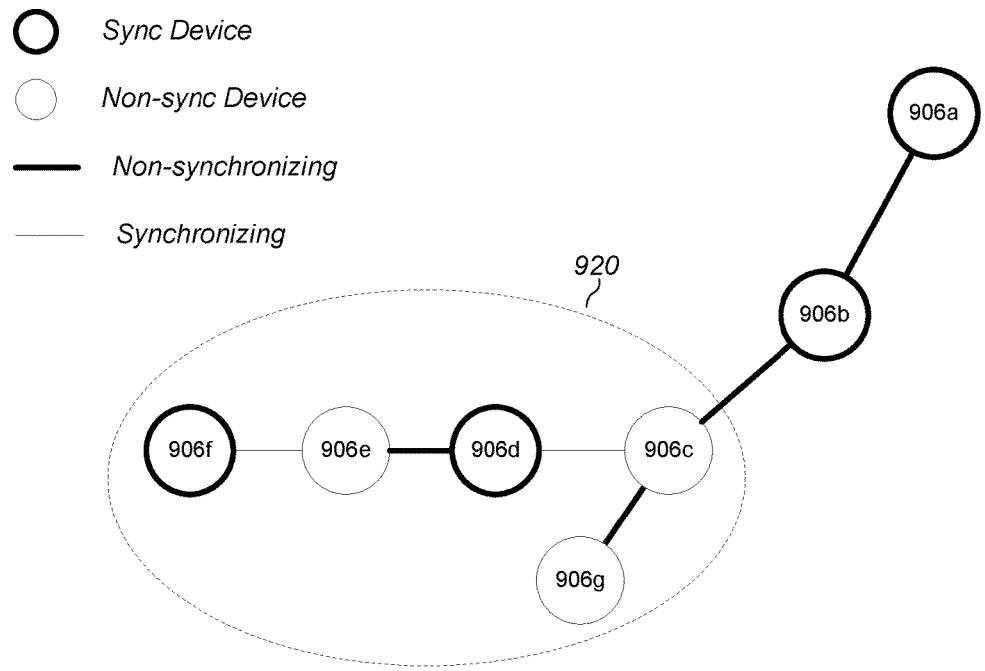

FIG. 9 illustrates yet another example of peer device synchronization, according to some embodiments. As illustrated devices 906*c*-*g* may be included in (or form) a data cluster 920 (e.g., a NAN data cluster). At some point in time after the data cluster 920 has been created, device 906*c* may discover a new anchor master, such as device 906*a* and may start to synchronize to device 906b, which in turn may synchronize to device 906a. However, based on the NAN 1.0 standard, since device 906c is in close proximity to device 906b, device 906c may become a non-master, non-sync device. Thus, in order to main tight synchronization with devices 906d and 906g, device 906c may transmit a data beacon (e.g., a NAN data beacon). Hence, since device 906g is in close proximity to device 906c, device 906g may become a non-master, non-sync device based on data beacons received from device 906c and device 906d may become a master device. In addition, device 906f may also become a master device, while device 906e may become a non-master, non-sync device.

Figure 10:
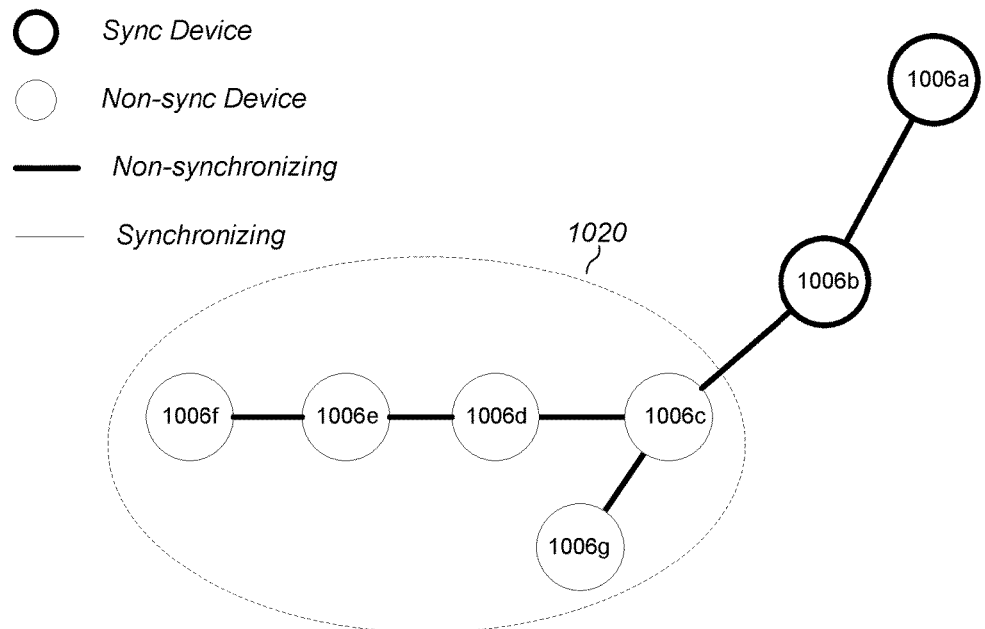

FIG. 10 illustrates yet another example of peer device synchronization, according to some embodiments. As illustrated devices 1006c-g may be included in (or form) a data cluster 1020 (e.g., a NAN data cluster). At some point in time after the data cluster 1020 has been created, device 1006c may discover a new anchor master, such as device 1006a and may start to synchronize to device 1006b, which in turn may synchronize to device 1006a. However, based on the NAN 1.0 standard, since device 1006c is in close proximity to device 1006b, device 1006c may become a non-master, non-sync device. Thus, in order to main tight synchronization with devices 1006d and 1006g, device 1006c may transmit a data beacon (e.g., a NAN data beacon). In addition, if both device 1006d and device 1006g are in close proximity to device 1006c, both devices may become non-master, non-sync devices and transmit data beacons. Further, if device 1006e is in close proximity to both device 1006d and device 1006f, all devices in the data cluster may become non-master, non-sync devices, but may maintain tight synchronization via transmission of data beacons.

Figure 11:
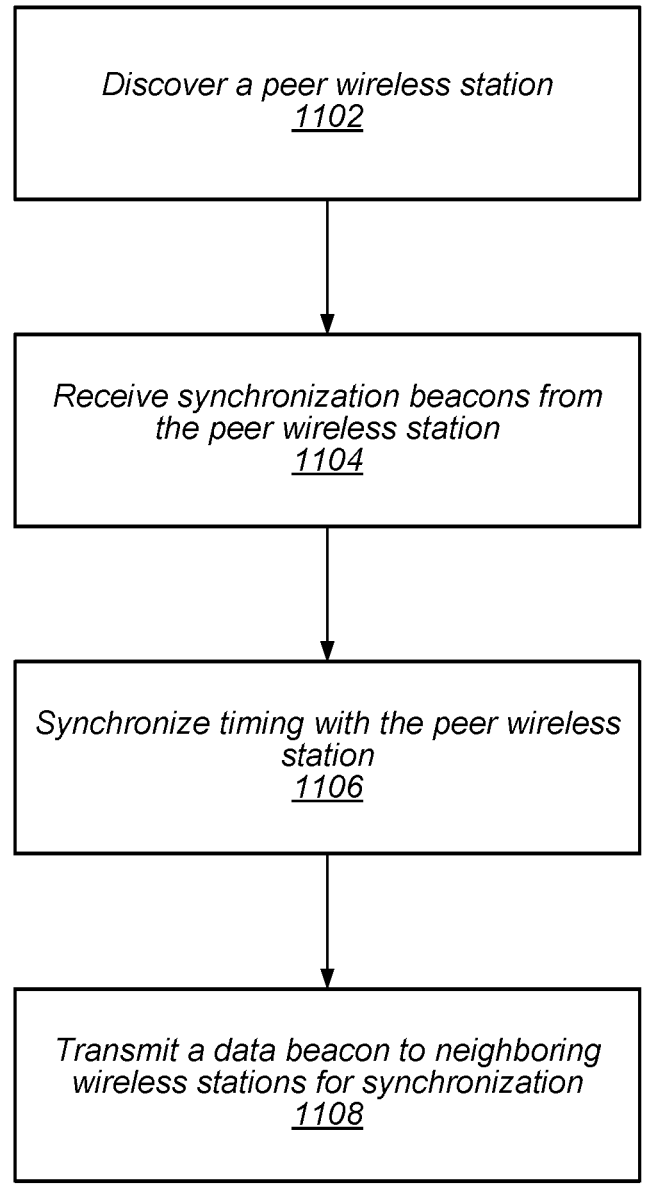
FIG. 11 illustrates a block diagram of an example of a method for peer device synchronization, according to some embodiments.

FIG. 11 illustrates a block diagram of an example of a method for peer device synchronization, according to some embodiments. The method shown in FIG. 11 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1102, a peer wireless station may be discovered. In some embodiments, discovery may include receiving one or more discovery beacons from the peer wireless station, e.g., in a discovery window. In some embodiments, the peer wireless station may be discovered via peer-to-peer Wi-Fi communications, e.g. according to a Wi-Fi peer-to-peer protocol such as Wi-Fi direct and/or NAN.

At 1104, synchronization beacons may be received from the peer wireless station. In some embodiments, the synchronization beacons may include one or more parameters such as a time stamp, a device role, a device state, a cluster identifier, an anchor master rank, a hop count to an anchor master, and/or anchor master beacon transmission time.

At 1106, timing may be synchronized with the peer wireless station, e.g., based (at least in part) on the received synchronization beacons.

At 1108, data beacons may be transmitted to one or more neighboring wireless stations for synchronization. In some embodiments, the data beacons may be transmitted via Wi-Fi peer-to-peer communications, e.g. according to a Wi-Fi peer-to-peer protocol such as Wi-Fi direct and/or NAN. In some embodiments, the data beacons may allow the neighboring wireless stations to synchronize to a transmitting device (e.g., the device transmitting the data beacons) as well as the peer wireless station. The data beacon may be transmitted in a base window of a data cluster schedule. In some embodiments, a data beacon may include one or more of a time stamp, a device role, a device state, a cluster identifier, an anchor master rank, a hop count to an anchor master, and/or anchor master beacon transmission time. In some embodiments, the device role may indicate whether the wireless station is a master or non-master station. In some embodiments, the device state may indicate whether the wireless station is in a synch or a non-synch state. In some embodiments, the data beacon may also include one or more of further availability information, a data link schedule, further availability preferences and limitations, a data link schedule proposal, a capability update, and/or a device operation mode update. In some embodiments the data beacons may indicate (or announce) an intention to merge to a new cluster and further indicate a future point in time for the merge. In some embodiments the data beacons may indicate (or announce) an intention to change to a new data cluster and further indicate at a future point in time for the change. In such embodiments, if the data beacons indicate a merge to a new cluster, the data beacon may further include a new cluster ID (e.g., corresponding to the new cluster), new cluster anchor master rank, clock/TSF offset between current and new clusters, merging time and/or count down, and/or device operation schedule changes. Additionally, if the data beacon indicates a change to a new data cluster, the data beacon may include a new data cluster ID (e.g., corresponding to the new data cluster), new data cluster base schedule (e.g., base windows), changing time and/or count down, and/or device operation schedule changes.

In some embodiments, the data beacons may indicate (or announce) device updates. For example, the data beacon may include further availability (FA) schedules, data link schedule, and/or data link schedule proposal updates, the FA preference and limitation updates, the member device's capabilities and operation modes updates, and/or pending data transmission indications, e.g., pending unicast transmissions to individual peers and pending multicast/broadcast transmissions.

In some embodiments, to mitigate medium access control issues in a dense (or very dense) data cluster, data beacons may be suppressed. For example, in a dense cluster (e.g., NAN cluster), a large number of devices may be in a non-master, non-sync state and may compete for medium access during data cluster base windows to transmit data beacons, e.g., when a data cluster change announcement is propagated within the data cluster, a large number of the member devices may relay the announcement during a data cluster base window leading to traffic congestion. Hence, in some embodiments, a random back off window may be implemented prior to transmitting the data beacon. In other words, transmission of data beacons within a base window may be delayed, e.g., to determine whether one or more data beacons are received prior to expiration of the delay (random back off). In some embodiments, the data beacons may be transmitted if no other data beacons are received and/or if a number of data beacons is below a threshold. In some embodiments, suppression of data beacons may be determined based (at least in part) on content of data beacons and/or medium conditions. For example, if the transmitted data beacons only serve for (tight) synchronization purposes and one or more data beacons that can also serve for (tight) synchronization have been received, transmission of data beacons may be suppressed.

In some embodiments, if the data beacons include indications to deliver (urgent) data cluster/device updates, but the data beacons are suppressed based on medium contention, the data beacons (or at least a portion of the data beacons related to updates) may be converted to unicast transmissions.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
  at least one antenna;
  at least one radio configured to perform Wi-Fi communication;
  at least one processor coupled to the at least one radio, wherein the wireless station is configured to perform voice and/or data communications;
  wherein the wireless station is configured to:
    discover a peer wireless station via peer-to-peer Wi-Fi communications;
    receive, during a cluster base window, synchronization beacons from the peer wireless station;
    synchronize timing with the peer wireless station based at least in part on the synchronization beacons;
    generate a data beacon comprising a time stamp, an indication of a device role within a data cluster, an indication of a device state within the data cluster, and a data cluster identifier corresponding to the data cluster;
    initiate, at a start of a subsequent cluster base window, a random back off timer;
    determine a number of data beacons received from the peer wireless station and/or one of the one or more neighboring wireless stations during a time period of the random back off timer;
    compare the number to a threshold, wherein, when the number does not exceed the threshold upon expiration of the random back off timer, the wireless station is further configured to transmit, via Wi-Fi peer-to-peer communications, the data beacon to one or more neighboring wireless stations, wherein the data beacon includes synchronization information for the one or more neighboring wireless stations to synchronize timing to the wireless station based at least in part on the data beacon; and wherein, when the number does exceed the threshold upon expiration of the random back off timer, the wireless station is further configured to suppress transmission of the data beacon to the one or more neighboring wireless stations.

2. The wireless station of claim 1,
  wherein the data beacon comprises at least:
    a time stamp;
    a device role;
    a device state;
    a cluster identifier;
    an anchor master rank;
    a hop count to an anchor master; or
    an anchor master beacon transmission time.

3. The wireless station of claim 2,
  wherein the device role indicates whether the wireless station is a master or non-master station.

4. The wireless station of claim 2,
  wherein the device state indicates whether the wireless station is in a sync state or a non-sync state.

5. The wireless station of claim 1,
  wherein the data beacon includes at least:
    an item of further availability information;
    a data link schedule;
    a further availability preference or limitation;
    a data link schedule proposal;
    a capability update; or
    a device operation mode update.

6. The wireless station of claim 1,
  wherein the wireless station is further configured to:
    determine the data beacon includes data cluster and/or wireless station updates; and
    convert the data beacon to a unicast transmission.

7. An apparatus, comprising:
  a memory; and
  at least one processor in communication with the memory;
  wherein the at least one processor is configured to:
    receive, during a cluster base window, data beacons from one or more neighboring wireless stations, wherein at least one of the data beacons comprises a time stamp, an indication of a neighboring wireless station's role within a data cluster, and an indication of the neighboring wireless station's state within the data cluster;
    synchronize timing with at least one of the one or more neighboring wireless stations based at least in part on the received data beacons;
    generate a first data beacon comprising a time stamp, an indication of a device role within a data cluster, an indication of a device state within the data cluster, and a data cluster identifier corresponding to the data cluster;
    initiate, at a start of the subsequent cluster base window, a random back off timer;

determine that a number of data beacons received during a time period of the random back off timer exceeds a threshold;

determine that content of the first data beacon includes only synchronization information; and determine, based on the received data beacons and content of the first data beacon, to suppress transmission of the first data beacon in the subsequent cluster base window.

8. The apparatus of claim 7, wherein the first data beacon further comprises at least one of:

an anchor master rank;

a hop count to an anchor master; or an anchor master beacon transmission time.

9. The apparatus of claim 7, wherein the indication of the neighboring wireless station's role indicates whether the neighboring wireless station is a master station.

10. The apparatus of claim 7, wherein the indication of the neighboring wireless station's state indicates whether the neighboring wireless station is in a sync state.

11. The apparatus of claim 7, wherein the first data beacon further comprises at least one of:

an item of further availability information;

a data link schedule;

a further availability preference or limitation;

a data link schedule proposal;

a capability update; or a device operation mode update.

12. The apparatus of claim 7, wherein, when the number does not exceed the threshold, the at least one processor is further configured to:

generate instructions to cause the first data beacon to be transmitted to at least one neighboring wireless device during the subsequent discovery window.

13. The apparatus of claim 7, wherein the at least one processor is further configured to:

determine the first data beacon includes data cluster and/or updates; and convert the first data beacon to a unicast transmission.

14. A non-transitory computer readable memory medium storing program instructions executable by a processor of a wireless device to:

synchronize timing with a peer wireless device based at least in part on one or more synchronization beacons received from the peer wireless device during a discovery window of a cluster base schedule;

generate a data beacon comprising a time stamp, an indication of a device role within a data cluster, an indication of a device state within the data cluster, and a data cluster identifier corresponding to the data cluster;

initiate, at a start of a subsequent discovery window, a random back off timer;

determine a number of data beacons received from the peer wireless device and/or one or more neighboring wireless devices during a time period of the random back off timer;

compare the number to a threshold; and determine, based on the number exceeding the threshold, to suppress transmission of the data beacon to at least one neighboring wireless device during the subsequent discovery window.

15. The non-transitory computer readable memory medium of claim 14, wherein the data beacon further comprises at least one of:

an anchor master rank;

a hop count to an anchor master; or an anchor master beacon transmission time.

16. The non-transitory computer readable memory medium of claim 14, wherein the device role indicates a master or non-master device.

17. The non-transitory computer readable memory medium of claim 14, wherein the device state indicates a sync or a non-sync state.

18. The non-transitory computer readable memory medium of claim 14, wherein the data beacon further comprises at least one of:

an item of further availability information;

a data link schedule;

a further availability preference or limitation;

a data link schedule proposal;

a capability update; or a device operation mode update.

19. The non-transitory computer readable memory medium of claim 14, wherein, when the number does not exceed the threshold, the program instructions are further executable to:

generate instructions to cause the data beacon to be transmitted to at least one neighboring wireless device during the subsequent discovery window.

20. The non-transitory computer readable memory medium of claim 14, wherein the program instructions are further executable to:

determine the data beacon includes data cluster and/or wireless device updates; and convert the data beacon to a unicast transmission.

* * * * *